UNITED STATES PATENT OFFICE.

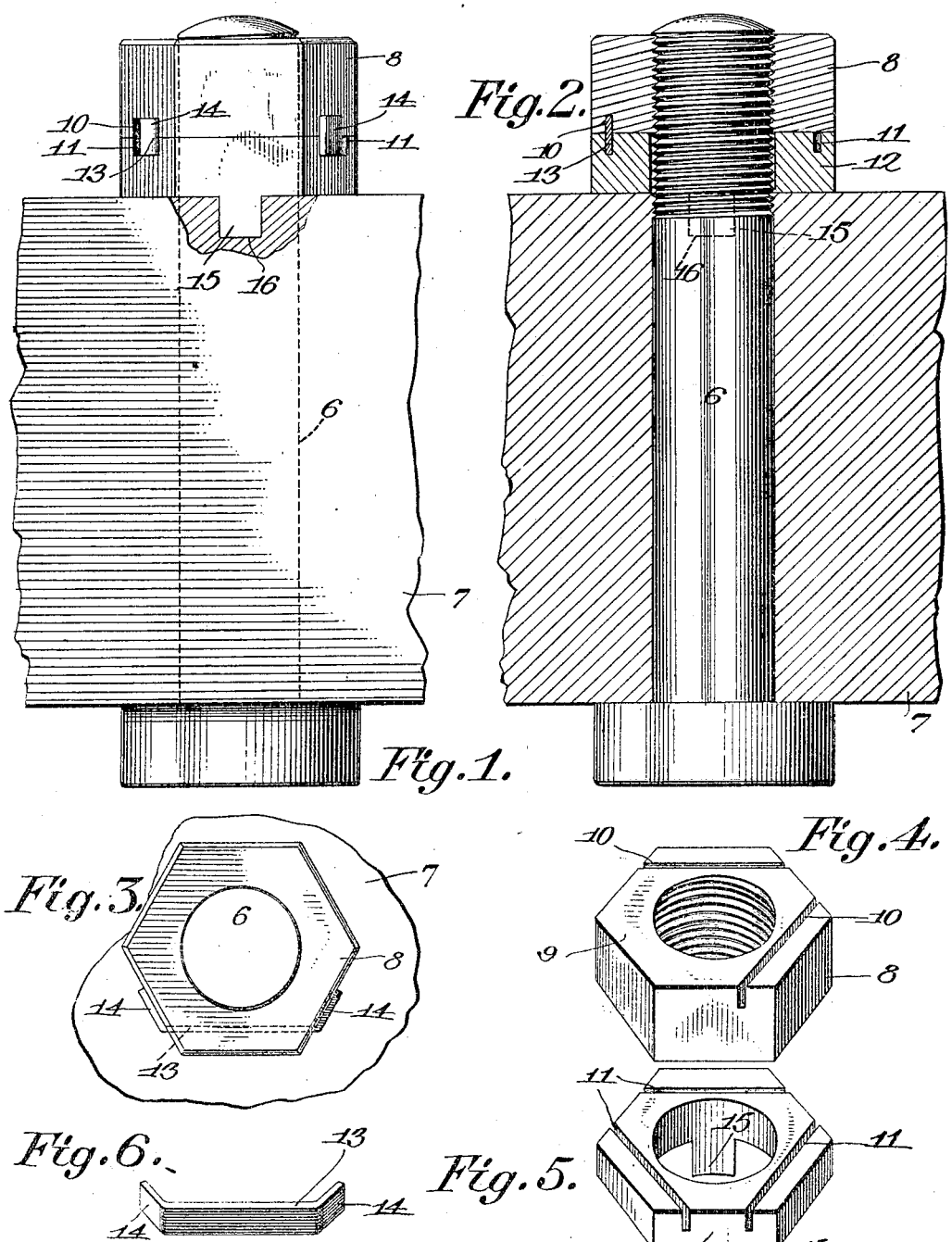

HEZEKIAH H. CRAWFORD, OF EL PASO, TEXAS.

LOCK-NUT.

No. 812,185.  Specification of Letters Patent.  Patented Feb. 13, 1906.

Application filed December 19, 1904. Serial No. 237,595.

*To all whom it may concern:*

Be it known that I, HEZEKIAH H. CRAWFORD, a citizen of the United States, residing at El Paso, in the county of El Paso and State of Texas, have invented a new and useful Lock-Nut, of which the following is a specification.

This invention relates to an improved nut-lock, and has for its object to provide a simple, inexpensive, and efficient device of this character by means of which the nut is effectually prevented from accidentally rotating on the bolt.

A further object of the invention is to form the lower surface of the nut and the adjacent face of the washer with a plurality of grooves or recesses adapted to receive a locking-key, whereby when the nut has been properly adjusted the same may be effectually locked in adjusted position by introducing the locking-key in said grooves or recesses.

With these and other objects in view the invention consists in the construction and novel combination and arrangement of parts hereinafter fully described, illustrated in the accompanying drawings, and pointed out in the claim hereto appended, it being understood that various changes in the form, proportions, and minor details of construction may be resorted to without departing from the principle or sacrificing any of the advantages of this invention.

In the accompanying drawings, forming a part of this specification, Figure 1 is a side elevation of a nut-lock constructed in accordance with my invention. Fig. 2 is a longitudinal sectional view of the same. Fig. 3 is a top plan view. Fig. 4 is a perspective view of the nut detached. Fig. 5 is a similar view of the washer. Fig. 6 is a perspective view of the locking-key detached.

Similar numerals of reference indicate corresponding parts in all the figures of the drawings.

The nut-lock, which may be applied to the bolts employed for connecting the adjacent ends of rail-sections or used any place where it is desirable to lock a nut against rotation, is shown applied to a bolt 6, passing through a beam or other suitable support 7. Threaded on the end of the bolt 6 is a hexagonal nut 8, the lower face 9 of which is provided with a plurality of key-seating grooves or recesses 10, which extend entirely across the face of the nut and are preferably arranged parallel with the sides of the latter, as shown. The grooves or recesses 10 are adapted to register with similar grooves or recesses 11, formed in the adjacent face of a washer 12, so as to permit the insertion of a locking key or bar 13, said bar being preferably rectangular in cross-section to conform to the shape of the seating-recesses, and thereby prevent rotation of said key. The opposite ends of the locking-key 13 after the latter is introduced in the seating-recess are bent laterally into engagement with the adjacent sides of the nut and washer, respectively, as clearly shown at 14 in Fig. 3, so that after the nut has been adjusted any further rotary movement thereof is effectually prevented by engagement with the laterally-turned ends of said key. The washer 12 is provided with oppositely-disposed depending lugs or spurs 15, adapted to engage corresponding sockets 16, formed in the fish-plate, beam, or other support 7, whereby the washer remains relatively stationary when adjusting the nut on the bolt 6.

In operation the washer is placed in position on the support 7 with the depending lugs engaging the sockets 16, after which the nut is adjusted on the bolt until one of the seating grooves or recesses in the nut registers with a similar groove in the adjacent face of the washer. The key or bar 13 is then introduced in the recess and the opposite ends thereof bent laterally into engagement with the angular sides of the nut. By having the key-seating grooves or recesses disposed parallel with the sides of the nut the adjustment of the latter may be quickly and accurately effected by simply giving the nut a partial rotation and inserting the key, the particular disposition of said seating-grooves rendering it possible to adjust the nut so as to exert any desired pressure on the washer.

Any number of seating-grooves may be formed in the adjacent faces of the nut and washer, and, if desired, the walls of said recesses may be curved or rounded to permit the use of a cylindrical locking key or bar.

From the foregoing it will be seen that there is produced a nut-securing means which will give perfect security, while possessing the requisite simplicity, cheapness, and durability.

Having thus described the invention, what is claimed is—

The combination with a support having a plurality of rectangular openings formed therein, of a threaded bolt passing through said support, a nut engaging the threaded end of the bolt and having a pair of seating-recesses formed in its lower face and disposed parallel with the sides of the nut, said recesses being arranged at an acute angle to each other and of the same lengths as the adjacent sides of the nut, a washer having a smooth central bore and of the same shape as the nut interposed between the latter and the support and provided with oppositely-disposed depending angular lugs for engagement with the openings in the support, said washer being also provided with a plurality of seating-recesses arranged in triangular form and adapted to register with the seating-recesses of the nut when the latter is adjusted, and a locking-key adapted to engage said recesses and having its opposite ends bent laterally into engagement with the sides of the nut and washer, respectively.

In testimony whereof I have signed my name to this specification in the presence of two subscribing witnesses.

HEZEKIAH H. CRAWFORD.

Witnesses:
H. A. ALBERTHAL,
F. A. HEWITT.